United States Patent
Graham et al.

(10) Patent No.: US 9,652,310 B1
(45) Date of Patent: May 16, 2017

(54) METHOD AND APPARATUS FOR USING CONSISTENT-HASHING TO ENSURE PROPER SEQUENCING OF MESSAGE PROCESSING IN A SCALE-OUT ENVIRONMENT

(71) Applicant: EMC Corporation, Hopkinton, MA (US)

(72) Inventors: Stephen G. Graham, Chapel Hill, NC (US); Cheuk Lam, Yorktown Heights, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/041,229

(22) Filed: Sep. 30, 2013

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .................................. *G06F 9/546* (2013.01)

(58) Field of Classification Search
None
See application file for complete search history.

(56) References Cited

U.S. PATENT DOCUMENTS

| | | | |
|---|---|---|---|
| 8,838,817 B1 * | 9/2014 | Biswas | H04L 45/38 709/230 |
| 2005/0166187 A1 * | 7/2005 | Das | G06F 9/546 7/136 |

\* cited by examiner

*Primary Examiner* — Craig Dorais
(74) *Attorney, Agent, or Firm* — Krishnendu Gupta; Robert Kevin Perkins

(57) ABSTRACT

Example embodiments of the present invention provide a method and a system for using consistent-hashing to ensure proper sequencing of message processing in a scale-out environment. The method includes receiving a stream of a plurality of messages and performing a consistent-hash on each message of the plurality of messages. Each message then may be distributed toward a respective downstream worker of a plurality of downstream workers for processing according to results of the hash.

19 Claims, 4 Drawing Sheets

METHOD AND APPARATUS FOR USING CONSISTENT-HASHING TO ENSURE PROPER SEQUENCING OF MESSAGE PROCESSING IN A SCALE-OUT ENVIRONMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to asynchronous messaging.

BACKGROUND

Asynchronous message processing is a very common pattern in computer science. Techniques involving Message Oriented Middleware, such as IBM's MQ Series or open source products such as Pivotal's (formerly VMWare's) RabbitMQ, provide great flexibility in building distributed information system architectures wherein data processing can happen in a distributed environment involving multiple simultaneous programs sending and receiving data over a message bus.

In order to increase the throughput of message processing, typically, in order to achieve processing of a large volume of event messages (e.g., stock trade data in a financial domain or alert/alarm processing from devices and other components in an IT infrastructure), the traditional best practice is to use scale out architectures, wherein a multiplicity of processing nodes are co-deployed and work in parallel to process the stream of incoming messages. This pattern is very typical in computer science and very common in Message Oriented Middleware centric architectures. A description of this pattern, commonly called the "worker queue pattern" in the context of message oriented middleware, can be found: http://www.rabbitmq.com/tutorials/tutorial-two-java.html, which is incorporated herein by reference in its entirety.

SUMMARY

Example embodiments of the present invention provide a method and a system for using consistent-hashing to ensure proper sequencing of message processing in a scale-out environment. The method includes receiving a stream of a plurality of messages and performing a consistent-hash on each message of the plurality of messages. Each message then may be distributed toward a respective downstream worker of a plurality of downstream workers for processing according to results of the hash.

BRIEF DESCRIPTION OF THE DRAWINGS

The above and further advantages of the present invention may be better under stood by referring to the following description taken into conjunction with the accompanying drawings in which.

DETAILED DESCRIPTION

A significant problem with the worker queue pattern arises when the event messages are not independent. For example, in the IT infrastructure monitoring domain, if a stream of messages depicting alerts/alarms from the infrastructure contains arbitrary sequences of alerts related to the same resource, it is critical that the sequence be maintained in exact order throughout the processing steps. With parallel asynchronous processing, such as appears in scale-out architectures using the worker queue pattern, it is very difficult to guarantee that messages related to a particular resource are processed exactly in the sequence they are generated.

For example, consider a sequence of events in which each event has two salient information items: the event "name" (reflecting the semantic of the message) and the event resource (reflecting the entity about which the event refers). In the case of alert/alarm processing, the event "name" might be "New Alert" (reflecting that this is a new situation for the corresponding entity), "Update Alert" (reflecting a change to an event previous in the event stream) or "Clear (Delete) Alert" (referring to an alert previous in the alert stream). The event resource in this example may be an identifier for the IT infrastructure component for which that alert/alarm event was created. It should be understood that these resources may be physical infrastructure devices (e.g., router, switch, host, array), virtual devices (e.g., virtual machines), or software components (e.g., databases, reverse web serving proxies, etc.). The stream of events may combine events for different resources, as well as a set of events related to the same resource. As described above, the sequence of these events matters to maintain the "New Alert", "Update Alert" (1 or more times), "Delete Alert" semantic (i.e., if any of the messages is processed out of order, the entire system may enter an inconsistent state, rendering the solution unreliable).

Figure 1:
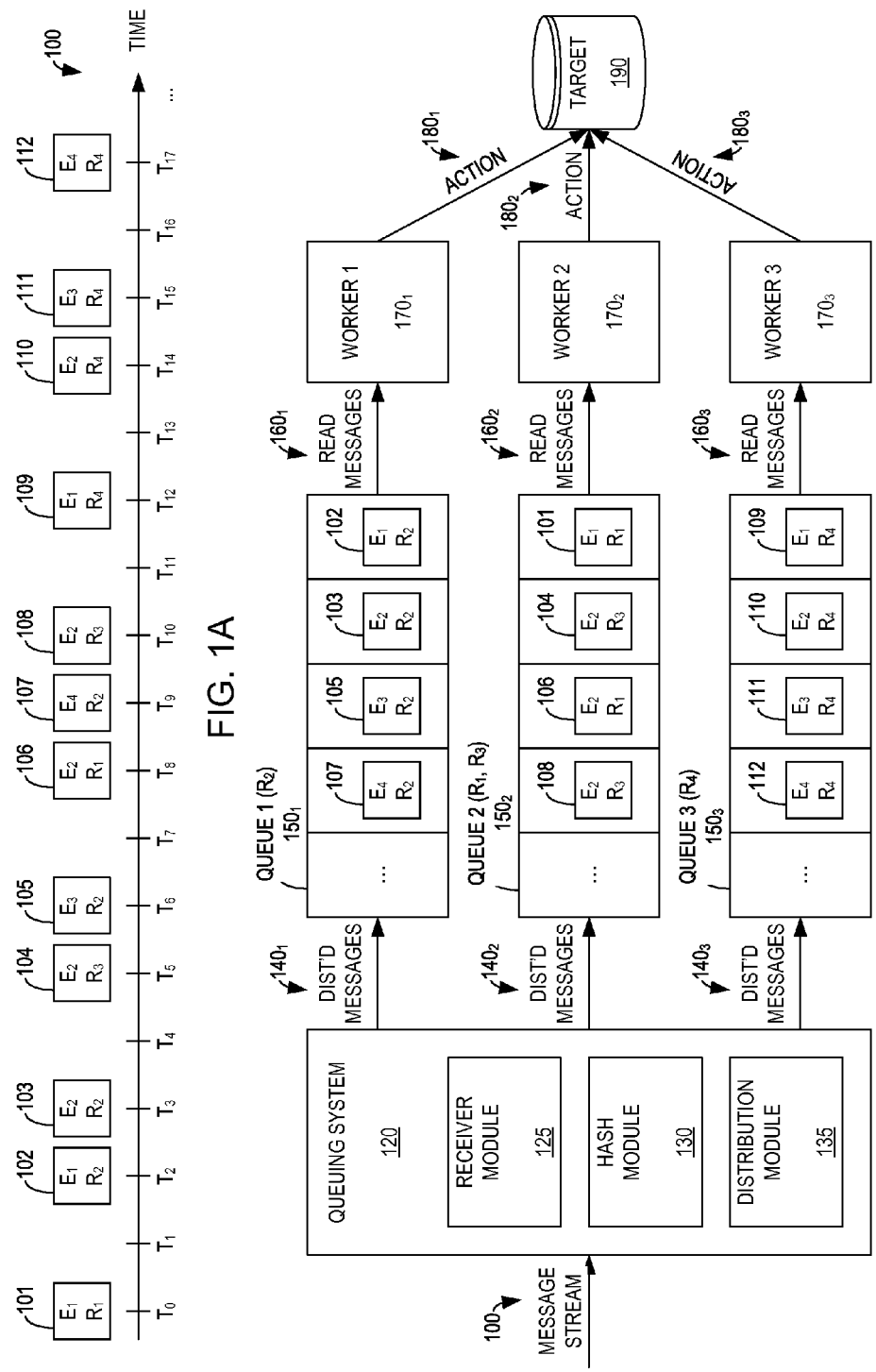
FIG. 1A is a block diagram of a stream of messages for different events generated by difference resources over time.
FIG. 1B is a block diagram of a system according to an example embodiment of the present invention.

FIG. 1A is a block diagram of a stream 100 of alerts 101-112 for different events (e.g., $E_1$, $E_2$, $E_3$, $E_4$) generated by different resources (e.g., $R_1$, $R_2$, $R_3$, $R_4$) over time (e.g., $T_0$-$T_{17}$). It should be understood that the number of different types of events (here 4) need not be the same as the number of difference resources (here 4). Event $E_1$ on resource $R_1$ is the first alert/message 101 in the stream 100 at time $T_0$. As described above, it is important that events for a given resource be processed in sequence. For example processing the message 110 $E_2$-$R_4$ before processing the message 109 $E_1$-$R_4$ would result in inconsistent processing (i.e., it is important for the semantics of the system, as described in greater detail below, that message 109 $E_1$-$R_4$ be processed before message 110 $E_2$-$R_4$ because they both relate to resource $R_4$, etc.). For example, message 109 $E_1$-$R_4$ may be an event that causes an alert record to be created in a database, and message 110 $E_2$-$R_4$ may be an event that updates that alert record. If message 110 $E_2$-$R_4$ were processed before message 109 $E_1$-$R_4$, then a database error would occur as update processing would fail on the alert record that had not been created yet (because message 109 $E_1$-$R_4$ was not processed yet).

FIG. 1B is a block diagram of a system according to an example embodiment of the present invention. As illustrated in FIG. 1B, the system may be configured as a scale out architecture including a queuing system 120, a plurality of queues 150$_1$, 150$_2$, 150$_3$ (150 generally) to queue messages 101-112 in the stream 100 distributed by the queuing system 120 (as described in greater detail below) and respective workers 170$_1$, 170$_2$, 170$_3$ for processing the messages 101-112 in parallel.

In a traditional scale out architecture without the queuing system 120, where multiple workers are processing the event stream 100 in parallel, it is quite possible that message sequences can be processed out of order. If the three workers 170 each process the stream 100 in parallel and treat the stream 100 as a queue (i.e., the worker queue pattern), message sequencing can get out of order because the processing cannot be guaranteed to preserve sequence of events (i.e., each of the workers 170 would read from the same shared queue, process messages, and update the database, as is intended in the worker queue pattern). For example, in this hypothetical without the queuing system 120 of example embodiments of the present invention, the problem is in maintaining the sequence of events $E_m$ with respect to a resource $R_n$. For example, if worker 1 170$_1$ dequeues and processes message 101 $E_1$-$R_1$, worker 2 170$_2$ dequeues and processes message 102 $E_1$-$R_2$, and worker 3 170$_3$ dequeues and processes message 103 $E_2$-$R_2$, and presuming worker 2 170$_2$ takes longer to process message 102 $E_1$-$R_2$ than worker 3 170$_3$ takes to process message 103 $E_2$-$R_2$ (e.g., it gets blocked because of other demands on the hardware upon which it is executing), worker 3 170$_3$ would update the database 190 with the results of processing message 103 $E_2$-$R_2$ before the database 190 is updated with the results of worker 2 170$_2$ processing message 102 $E_1$-$R_2$ (i.e., the events are processed out of order and the semantic of sequence preservation is lost).

Figure 2:
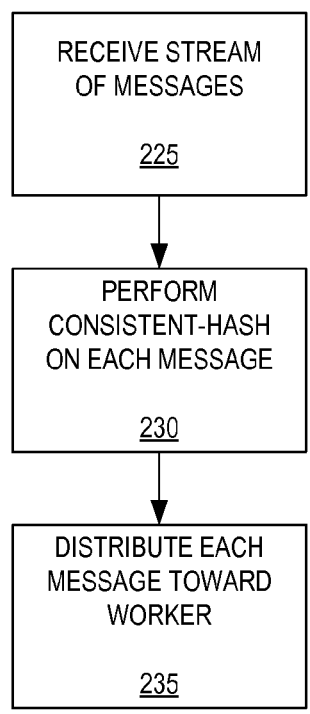
FIGS. 2 and 3 are flow diagrams illustrated methods according to respective example embodiments of the present invention.

Accordingly, example embodiments of the present invention overcome these and other deficiencies by using consistent-hashing to ensure proper sequencing of message processing in a scale-out environment. FIG. 1B may be studied in conjunction with FIGS. 2 and 3 which are flow diagrams illustrating methods according to respective example embodiments of the present invention. As illustrated in FIGS. 1B and 2, the queuing system 120 may include a receiver module 125, a hash module 130, and a distribution module 135. The receiver module 125 may be configured to receive a stream 100 of a plurality of messages 101-112 (225). Upon receipt of a message, the hash module 130 may perform a consistent-hash on each message of the plurality of messages 101-112 (230) and the distribution module 135 may distribute each message toward a respective downstream worker 170 of a plurality of downstream workers 170 for processing (235) according to the results of the hash. As will be described in greater detail below, the use of consistent-hashing in example embodiments of the present invention ensures proper sequencing of message processing.

As illustrated in FIG. 1B, the event messages 101-112 may be distributed from the queuing system 120 to a collection of parallel distributed workers 170 using consistent-hashing by distributing event messages 101-112 to different queues 150. The hash module 130 may take a hash of a message 101-112 (i.e., a hash on a specific information item within the message such as a message header, routing key, URI, UUID, or some other identifier) and associate different segments of the hash space with the queues 150.

The semantic this delivers is that any message 101-112 that generates a specific hash value according to the hash module 130 is guaranteed to be sent to the same queue 150. It should be understood that a message 101-112 cannot be related to two resources $R_n$ (i.e., a higher level message (e.g., network) would be related to a port, or a link, for example, or some logical resource that may comprise a collection of resources).

Accordingly, consistent-hashing guarantees that for any resource (e.g., any value of $R_n$), messages will always be delivered to the same queue 150. Advantageously, the relative processing speeds of the workers 170 does not affect the sequence of processing of the events 101-112 because events for the same resource $R_1$, are always delivered to the same queue 150 and, therefore, the same worker 170 for processing. In other words, referring to the hypothetical posted above, it is not possible for message 103 $E_2$-$R_2$ to be processed before message 102 $E_1$-$R_2$. Therefore, in example embodiments of the present invention, scale out architectures may be built safely that process a message stream 100 in a specific sequence order, which is critical for scale out solutions to IT infrastructure alert/alarm solutions and management applications, such as Smarts by EMC Corporation of Hopkinton, Mass.

Figure 3:
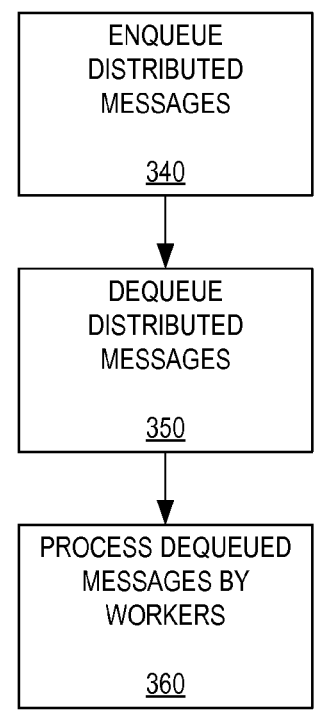

As illustrated in FIGS. 1B and 3, the queue 150 then may enqueue the distributed messages 140 and dequeue the messages. Accordingly, in the example embodiments illustrated in FIG. 1B, the workers 170 may read the messages 160 by the workers 170 for processing and process the messages which may take actions 180 on a target 190, for example perform operations on a database.

Figure 4:
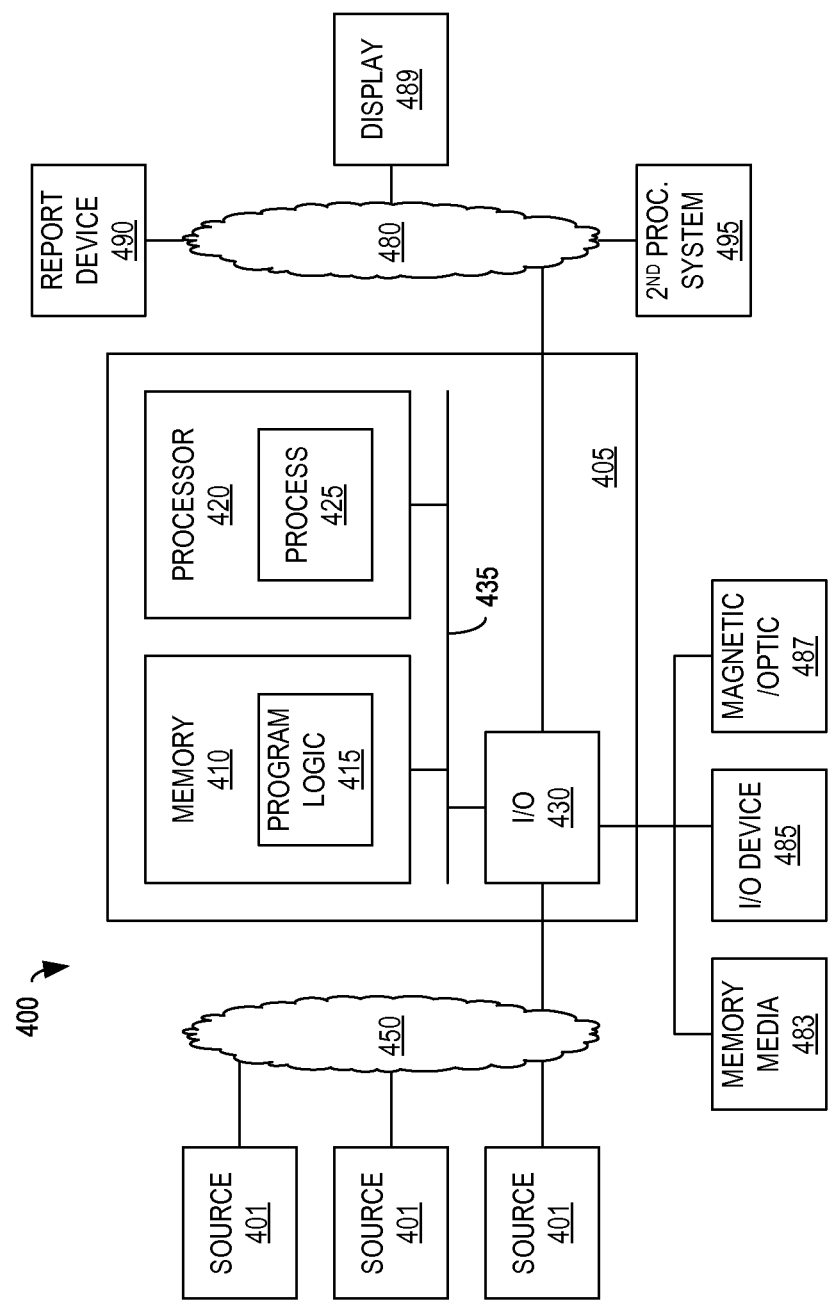
FIG. 4 is a block diagram of an apparatus according to an example embodiment of the present invention.

FIG. 4 is a block diagram of an example embodiment apparatus 405 according to the present invention. The apparatus 405 may be part of a system 400 and includes memory 410 storing program logic 415, a processor 420 for executing a process 425, and a communications I/O interface 430, connected via a bus 435.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 5:
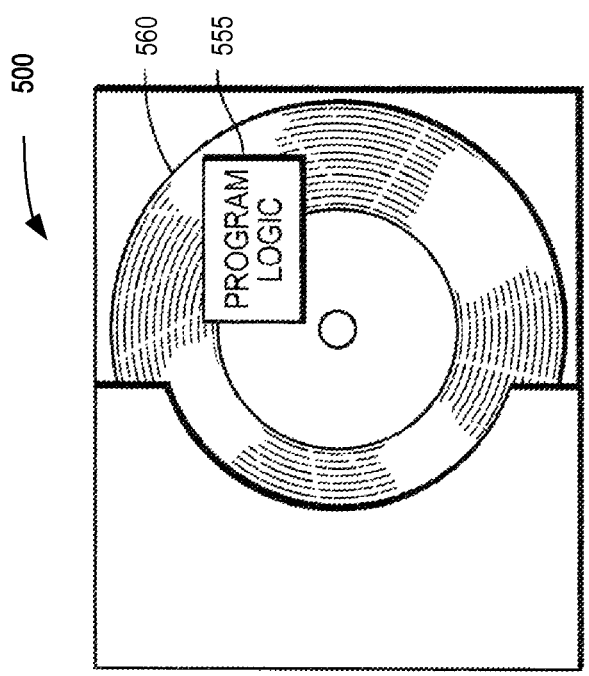
FIG. 5 is an illustration of an example embodiment of the present invention embodied as a computer program product.

FIG. 5 shows program logic 555 embodied on a computer-readable medium 560 as shown, and wherein the logic 555 is encoded in computer-executable code configured for carrying out the methods of this invention, thereby forming a computer program product 500.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
segmenting a hash space of resource values according to a number of a plurality of queues configured to queue messages for processing by a plurality of workers, wherein a queuing system includes a receiver module, a hash module, and a distribution module;
receiving a message, by the receiver module, in a stream of a plurality of messages from a plurality of information technology infrastructure resources, each message comprising an event-resource pair and the plurality of messages defining a time-series of events for each resource, wherein the event-resource pair of a message includes information regarding an event indicating semantics of the message and an event resource information indicating an identity of an information technology infrastructure component from the plurality of information technology infrastructure resources for which the event has been created;
performing a consistent-hash, by the hash module, on the message over the segmented hash space according to the resource value of its event-resource pair to determine a hash value of the message, wherein the same hash value is generated for each messages created for the same event resource thereby enabling the queuing system to distribute events created for the same event resource to the same queue; and
distributing the message, by the distribution module, to a particular queue selected according to the hash value for processing by a worker associated with the particular queue, wherein a number of messages each having the same hash value is guaranteed to be sent to the particular queue thereby enabling a consistent processing sequence of the messages according to the event values of the event-resource pairs, wherein the consistent processing sequence indicates that messages related to a specific event resource are processed in the same order in which the messages are generated.

2. The method of claim 1 wherein receiving a message in a stream of a plurality of messages comprises receiving the stream of messages from an information technology (IT) management application.

3. The method of claim 1 further comprising scaling a scale out architecture comprising the queues and workers by adjusting the number of queues.

4. The method of claim 1 wherein each message comprises a resource identifier and wherein performing a consistent-hash on the message further comprises performing the consistent-hash on the message according to its resource identifier.

5. The method of claim 4 wherein distributing the message to a particular queue selected according to the hash value and the segmented hash space for processing by a worker associated with the particular queue comprises distributing each message to a queue assigned to the segment of the hash space to queue the distributed messages for processing by the workers.

6. The method of claim 5 further comprising enqueuing the distributed messages in their respective queue.

7. The method of claim 6 wherein enqueuing the distributed messages in their respective queue ensures ordering of the messages having the resource identifier.

8. The method of claim 6 further comprising dequeuing the distributed messages in the queue for processing by the workers.

9. The method of claim 8 further comprising processing the dequeued messages by the workers.

10. A system comprising:
a processor; and
memory storing computer executable instructions that when executed on the processor causes the system to perform the operations of:
segmenting a hash space of resource values according to a number of a plurality of queues configured to queue messages for processing by a plurality of workers, wherein a queuing system includes a receiver module, a hash module, and a distribution module;
receiving a message, by the receiver module, in a stream of a plurality of messages from a plurality of information technology infrastructure resources, each message comprising an event-resource pair and the plurality of messages defining a time-series of events for each resource, wherein the event-resource pair of a message includes information regarding an event indicating semantics of the message and an event resource information indicating an identity of an information technology infrastructure component from the plurality of information technology infrastructure resources for which the event has been created;
performing a consistent-hash, by the hash module, on the message over the segmented hash space according to the resource value of its event-resource pair to determine a hash value of the message, wherein the same hash value is generated for each messages created for the same event resource thereby enabling the queuing system to distribute events created for the same event resource to the same queue; and
distributing the message, by the distribution module, to a particular queue selected according to the hash value for processing by a worker associated with the particular queue, wherein a number of messages each having the same hash value is guaranteed to be sent to the particular queue thereby enabling a consistent processing sequence of the messages according to the event values of the event-resource pairs, wherein the consistent processing sequence indicates that messages related to a specific event resource are processed in the same order in which the messages are generated.

11. The system of claim 10 wherein receiving a message in a stream of a plurality of messages comprises receiving the stream of messages from an information technology (IT) management application.

12. The system of claim 10 further comprising a scale out architecture configured to be adjusted in the number of queues.

13. The system of claim 10 wherein each message comprises a resource identifier and wherein performing a consistent-hash on the message further comprises performing the consistent-hash on the message according to its resource identifier.

14. The system of claim 13 wherein distributing the message to a particular queue selected according to the hash value and the segmented hash space for processing by a worker associated with the particular queue comprises distributing each message to a queue assigned to the segment of the hash space to queue the distributed messages for processing by the workers.

15. The system of claim 14 wherein the memory further stores computer executable instructions that when executed on the processor causes the system to perform the operations of enqueuing the distributed messages in their respective queue.

16. The system of claim 15 wherein enqueuing the distributed messages in their respective queue ensure ordering of the messages having the resource identifier.

17. The system of claim 15 wherein the memory further stores computer executable instructions that when executed on the processor causes the system to perform the operations of dequeuing the distributed messages in the queue for processing by the workers.

18. The system of claim 17 wherein the workers are configured to process the dequeued messages.

19. A computer program product including a non-transitory computer readable storage medium storing computer program code comprising:
    computer program code for segmenting a hash space of resource values according to a number of a plurality of queues configured to queue messages for processing by a plurality of workers, wherein a queuing system includes a receiver module, a hash module, and a distribution module;
    computer program code for receiving a message, by the receiver module, in a stream of a plurality of messages from a plurality of information technology infrastructure resources, each message comprising an event-resource pair and the plurality of messages defining a time-series of events for each resource, wherein the event-resource pair of a message includes information regarding an event indicating semantics of the message and an event resource information indicating an identity of an information technology infrastructure component from the plurality of information technology infrastructure resources for which the event has been created;
    computer program code for performing a consistent-hash, by the hash module, on the message over the segmented hash space according to the resource value of its event-resource pair to determine a hash value of the message, wherein the same hash value is generated for each messages created for the same event resource thereby enabling the queuing system to distribute events created for the same event resource to the same queue; and
    computer program code for distributing the message, by the distribution module, to a particular queue selected according to the hash value for processing by a worker associated with the particular queue, wherein a number of messages each having the same hash value is guaranteed to be sent to the particular queue thereby enabling a consistent processing sequence of the messages according to the event values of the event-resource pairs, wherein the consistent processing sequence indicates that messages related to a specific event resource are processed in the same order in which the messages are generated.

* * * * *